(12) United States Patent
Silverstein et al.

(10) Patent No.: US 11,071,912 B2
(45) Date of Patent: Jul. 27, 2021

(54) VIRTUAL REALITY IMMERSION

(71) Applicant: International Business Machines Corporation, Armonk, NY (US)

(72) Inventors: Zachary Silverstein, Austin, TX (US); Robert Huntington Grant, Atlanta, GA (US); Trey Maston, Edmond, OK (US); John Edward Martin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 126 days.

(21) Appl. No.: 16/298,593

(22) Filed: Mar. 11, 2019

(65) Prior Publication Data

US 2020/0289926 A1 Sep. 17, 2020

(51) Int. Cl.
*A63F 13/00* (2014.01)
*A63F 9/24* (2006.01)
*A63F 13/424* (2014.01)
*G06F 3/16* (2006.01)
*G10L 25/51* (2013.01)
(Continued)

(52) U.S. Cl.
CPC .......... *A63F 13/424* (2014.09); *A63F 13/215* (2014.09); *A63F 13/52* (2014.09); *G06F 3/16* (2013.01); *G06N 20/00* (2019.01); *G10L 25/51* (2013.01); *A63F 2300/6072* (2013.01);
(Continued)

(58) Field of Classification Search
CPC ..... A63F 13/215; A63F 13/424; G06T 19/006
See application file for complete search history.

(56) References Cited

U.S. PATENT DOCUMENTS

| 5,566,237 A * | 10/1996 | Dobbs | H03G 5/025 |
| | | | 333/28 R |
| 8,976,265 B2 * | 3/2015 | Marks | A63F 13/04 |
| | | | 348/231.4 |

(Continued)

OTHER PUBLICATIONS

Dachis, A. "HoloHear Is Like Google Translate for Deaf People." Sep. 15, 2016 [Accessed Jan. 17, 2019] https://hololens.reality.news/news/holohear-is-like-google-translate-for-deaf-people-0171936/, 2 pgs.

(Continued)

*Primary Examiner* — Milap Shah
(74) *Attorney, Agent, or Firm* — Peter K. Suchecki

(57) ABSTRACT

Provided is a method, computer program product, and virtual reality system for mapping detected external stimuli to visual stimuli within a virtual reality simulation. A processor may detect an audio stimulus external to a virtual reality simulation. The processor may compare a noise level of the detected external audio stimulus to a threshold noise level relative to internal audio in the virtual reality simulation. The processor may identify, in response to determining that the noise level of the detected external audio stimulus is greater than the threshold noise level, a sound corresponding to the detected external audio stimulus. The processor may retrieve environmental factors of the virtual reality simulation. The processor may map the detected external audio stimulus to a visual stimulus in the virtual reality simulation based on the identified type of sound and the environmental factors. The processor may produce the visual stimulus in the virtual reality simulation.

18 Claims, 7 Drawing Sheets

| Sound Type | Jungle Simulation | City Simulation | Snow Simulation |
|---|---|---|---|
| Door Slamming | Tree branch falling | Car accident/thunder | Avalanche |
| Phone ringing | Bird song | Virtual person's phone ringing | Radio buzzing |
| Person talking | Wildlife sounds | Nearby conversation | Ice cracking |
| Dog barking | Wildlife sounds | Dog barking | Snow dog barking |

(51) Int. Cl.
*G06N 20/00* (2019.01)
*A63F 13/52* (2014.01)
*A63F 13/215* (2014.01)

(52) U.S. Cl.
CPC ............... *A63F 2300/6081* (2013.01); *A63F 2300/8082* (2013.01)

(56) References Cited

U.S. PATENT DOCUMENTS

| | | | | |
|---|---|---|---|---|
| 9,563,265 | B2* | 2/2017 | You | G06F 3/167 |
| 9,648,436 | B2* | 5/2017 | Kraft | H04R 1/1083 |
| 10,410,432 | B2* | 9/2019 | Bastide | G06F 3/167 |
| 10,695,663 | B2* | 6/2020 | Begum | A63F 13/25 |
| 2009/0287640 | A1* | 11/2009 | Hamilton, II | G06Q 90/00 |
| 2011/0228764 | A1* | 9/2011 | Jorgensen | A63F 13/00 370/352 |
| 2013/0094682 | A1* | 4/2013 | Lee | H04R 3/002 381/306 |
| 2013/0215010 | A1 | 8/2013 | Hermosdsson | |
| 2013/0236040 | A1* | 9/2013 | Crawford | H04S 7/306 381/310 |
| 2013/0293723 | A1* | 11/2013 | Benson | G02B 27/017 348/164 |
| 2015/0195641 | A1* | 7/2015 | Di Censo | H04R 1/1083 381/71.6 |
| 2015/0269779 | A1 | 9/2015 | Wong et al. | |
| 2015/0373474 | A1* | 12/2015 | Kraft | H04W 4/029 381/17 |
| 2016/0142830 | A1 | 5/2016 | Hu | |
| 2017/0068508 | A1* | 3/2017 | Cricri | H04S 7/30 |
| 2017/0173454 | A1* | 6/2017 | Begum | A63F 13/215 |
| 2017/0315608 | A1* | 11/2017 | Shanware | G06F 3/0346 |
| 2018/0117469 | A1* | 5/2018 | Ilse | A63F 13/215 |
| 2018/0160105 | A1 | 6/2018 | Ross et al. | |
| 2018/0190017 | A1* | 7/2018 | Mendez | G06T 17/00 |
| 2018/0256979 | A1* | 9/2018 | Kunieda | A63F 13/65 |
| 2019/0130654 | A1* | 5/2019 | Bastide | G06T 15/00 |
| 2019/0320138 | A1* | 10/2019 | Kaufthal | G02B 27/017 |
| 2019/0344185 | A1* | 11/2019 | Fargo | G06F 3/165 |
| 2020/0236487 | A1* | 7/2020 | Kratz | H04S 3/008 |
| 2020/0255026 | A1* | 8/2020 | Katardjiev | B60W 40/06 |

OTHER PUBLICATIONS

Grimshaw, "Sound and immersion in the first-person shooter," http://ubir.bolton.ac.uk/255/1/gcct_journalspr-3.pdf, University of Bolton, UBIR: University of Bolton Institutional Repository, School of Games Computing and Creative Technologies, Games Computing and Creative Technologies: Journal Articles (Peer-Reviewed), 2008, 8 pgs.

Inoue et al., "Visualization of 3D Sound Field using See-Through Head Mounted Display." In Proceedings of SIGGRAPH '17 Posters, Jul. 30-Aug. 3, 2017, 2 pgs., DOI: 10.1145/3102163.3102243.

Mell et al., "The NIST Definition of Cloud Computing," Recommendations of the National Institute of Standards and Technology, U.S. Department of Commerce, Special Publication 800-145, Sep. 2011, 7 pgs.

Rizzotto, L, "The Future of Education: How A.I. and Immersive Tech Will Reshape Learning Forever," https://medium.com/futurepi/a-vision-for-education-and-its-immersive-a-i-driven-future-b5a9d34ce26d, Jun. 23, 2017, printed Feb. 6, 2019, 37 pgs.

Unknown, "Sound Detection and Identification," http://dhoiem.cs.illinois.edu/projects/solar/, printed Feb. 6, 2019, 2 pgs.

Zenner et al., "Immersive Notification Framework: Adaptive & Plausible Notifications in Virtual Reality," In Extended Abstracts of the 2018 CHI Conference on Human Factors in Computing Systems (CHI EA '18). ACM, New York, Paper LBW609, 6 pages, 2018.

* cited by examiner

| Sound Type | Jungle Simulation | City Simulation | Snow Simulation |
|---|---|---|---|
| Door Slamming | Tree branch falling | Car accident/thunder | Avalanche |
| Phone ringing | Bird song | Virtual person's phone ringing | Radio buzzing |
| Person talking | Wildlife sounds | Nearby conversation | Ice cracking |
| Dog barking | Wildlife sounds | Dog barking | Snow dog barking |

FIG. 3

VIRTUAL REALITY IMMERSION

BACKGROUND

The present disclosure relates generally to the field of virtual reality (VR), and more specifically, to mapping external audio stimuli to contextual visual stimuli within a virtual reality simulation.

As virtual reality (VR) becomes more prevalent, users are becoming increasingly interested in a seamless immersion experience within the virtual world. However, external real-world stimuli may interrupt the virtual immersion experience.

SUMMARY

Embodiments of the present disclosure include a method, computer program product, and virtual reality system for mapping detected external stimuli to visual stimuli within a virtual reality simulation. A processor may detect an audio stimulus external to a virtual reality simulation. The processor may compare a noise level of the detected external audio stimulus to a threshold noise level relative to internal audio in the virtual reality simulation. The processor may identify, in response to determining that the noise level of the detected external audio stimulus is greater than the threshold noise level, a type of sound corresponding to the detected external audio stimulus. The processor may retrieve environmental factors of the virtual reality simulation. The processor may map the detected external audio stimulus to a visual stimulus in the virtual reality simulation based on the identified type of sound and the environmental factors. The processor may produce the visual stimulus in the virtual reality simulation.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

FIG. 3 illustrates an example sound mapping table, in accordance with embodiments of the present disclosure.

Figure 1:
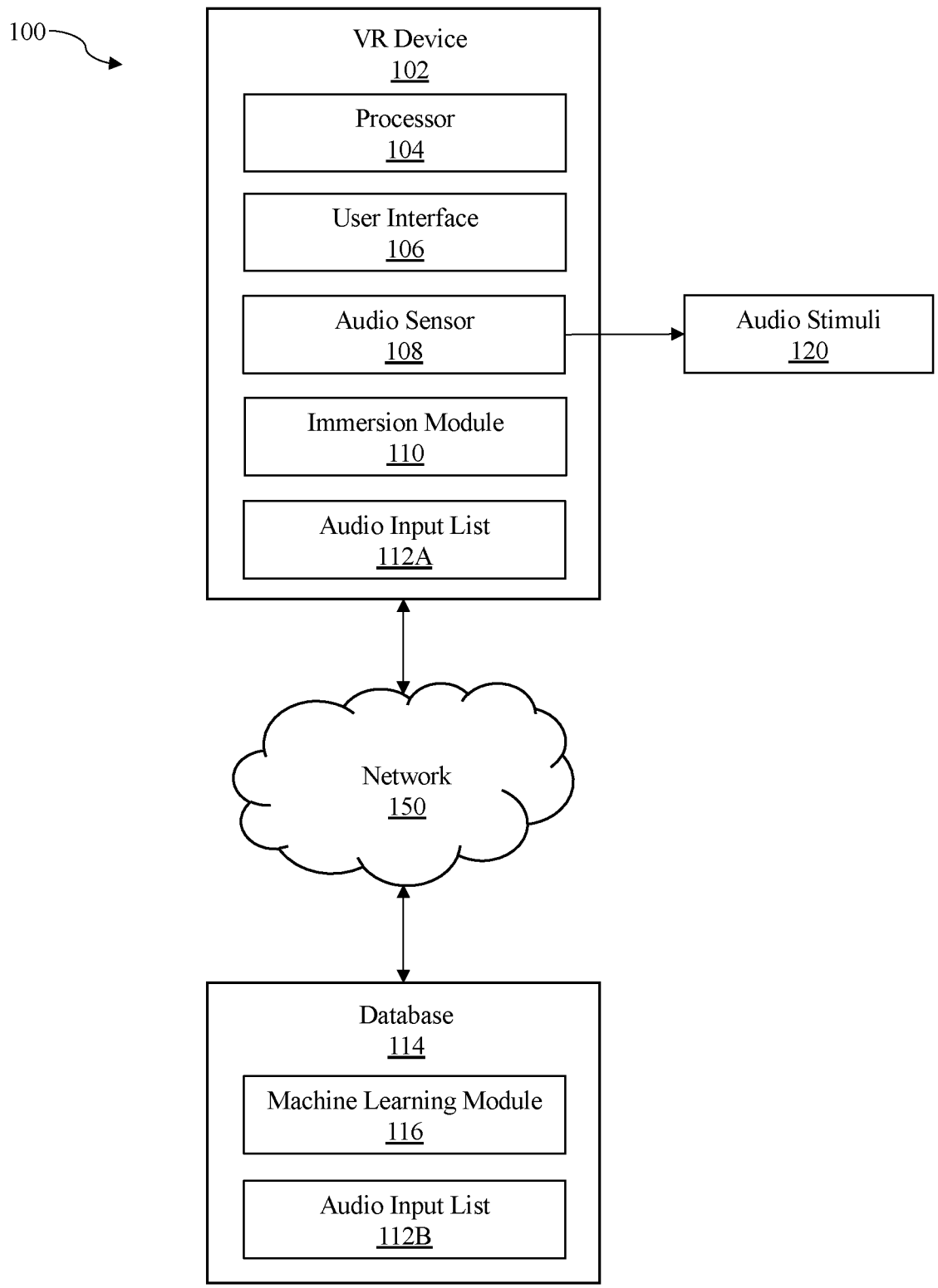
FIG. 1 illustrates a block diagram of a virtual reality system, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate to the field of virtual reality, and more particularly to mapping detected external audio stimuli to contextual visual stimuli within a virtual reality simulation for a seamless immersion experience. While the present disclosure is not necessarily limited to such applications, various aspects of the disclosure may be appreciated through a discussion of various examples using this context.

As virtual reality (VR) and, in some cases, augmented reality become more prevalent, users are becoming increasingly interested in a seamless immersion experience within the virtual world. However, external real-world stimuli may interrupt the virtual immersion experience. For example, while a user is immersed in a VR experience, a door in the external world may be slammed. The noise produced from the slammed door typically does not match up with the in-game visuals the user is currently seeing, thus breaking the VR experience. For example, the user may be playing a game that takes place in a remote jungle setting. Hearing a door being slammed may distract the user since there are no doors displayed within the jungle simulation.

In another example, a user may be immersed in a VR simulation that mimics a city environment. While exploring in the simulation, the user may hear an external voice talking within the room where the user is playing the VR game. However, there may be no in-game virtual person within the vicinity of the user in the simulation. Again, the external sound will break the immersion experience because what the user is hearing from the external world is not syncing up with what the user is seeing in the VR simulation.

A solution to masking external audio may be to increase the in-game volume of sounds within the VR simulation. However, an increased volume capable of masking external sounds completely may make the VR simulation experience uncomfortable for the user. Another alternative may be for the user to wear noise cancelling headphones. However, noise cancelling headphones may not completely prevent external sounds from being heard by the user.

Embodiments of the present disclosure identify external audio stimuli and map the external audio stimuli to contextual visual stimuli displayed within the VR simulation. In this way, a user may maintain a seamless VR experience by seeing visual stimuli that matches any external audio they may hear while in the VR simulation.

In an embodiment, a virtual reality device may include an immersion module that detects audio stimuli outside of the in-game simulation audio. If the external audio exceeds a noise threshold related to the in-game simulated audio, then the immersion module is triggered to identify the external sound by comparing the sound against a list of known sounds. Once the external sound is determined, the sound is mapped to contextual in-game visual stimuli and displayed in the VR simulation.

For example, a user may be playing a VR game where the user is exploring the jungle. One of the most important factors for user's in-game enjoyment is immersion within the VR environment. As the user is walking through the virtual jungle, a second person, external to the game, accidentally slams a door. The immersion module may detect the audio from the door slamming and contextualize the sound to the user's current in-game experience.

For example, the system may determine that the audio produced by the slammed door is most similarly paired with a falling tree branch inside the jungle simulation. Once determined, the system may display a breaking tree branch within the line of site of the user, such that the external sound is contextualized to the virtual image. Although the door slamming sound may not be exactly similar to the sound of a tree branch breaking, it may be similar enough to mask recognition of the external sound and prevent the user from breaking the immersion experience.

The aforementioned advantages are example advantages, and not all advantages are discussed. Furthermore, embodiments of the present disclosure can exist that contain all, some, or none of the aforementioned advantages while remaining within the spirit and scope of the present disclosure.

With reference now to FIG. 1, shown is a block diagram of a virtual reality system 100, in accordance with embodiments of the present disclosure. In the illustrated embodiment, the virtual reality system 100 includes a virtual reality device 102 (hereinafter referred to as VR device 102) and a database 114 that are communicatively coupled via a network 150. The network 150 may be any type of communication network, such as a wireless network or a cloud computing network. In some embodiments, the virtual reality system 100 may only include the VR device 102. For example, the VR device 102 may be a stand-alone system that is not connected to another device (e.g., database 114, and/or other VR devices) through a network.

Figure 7:
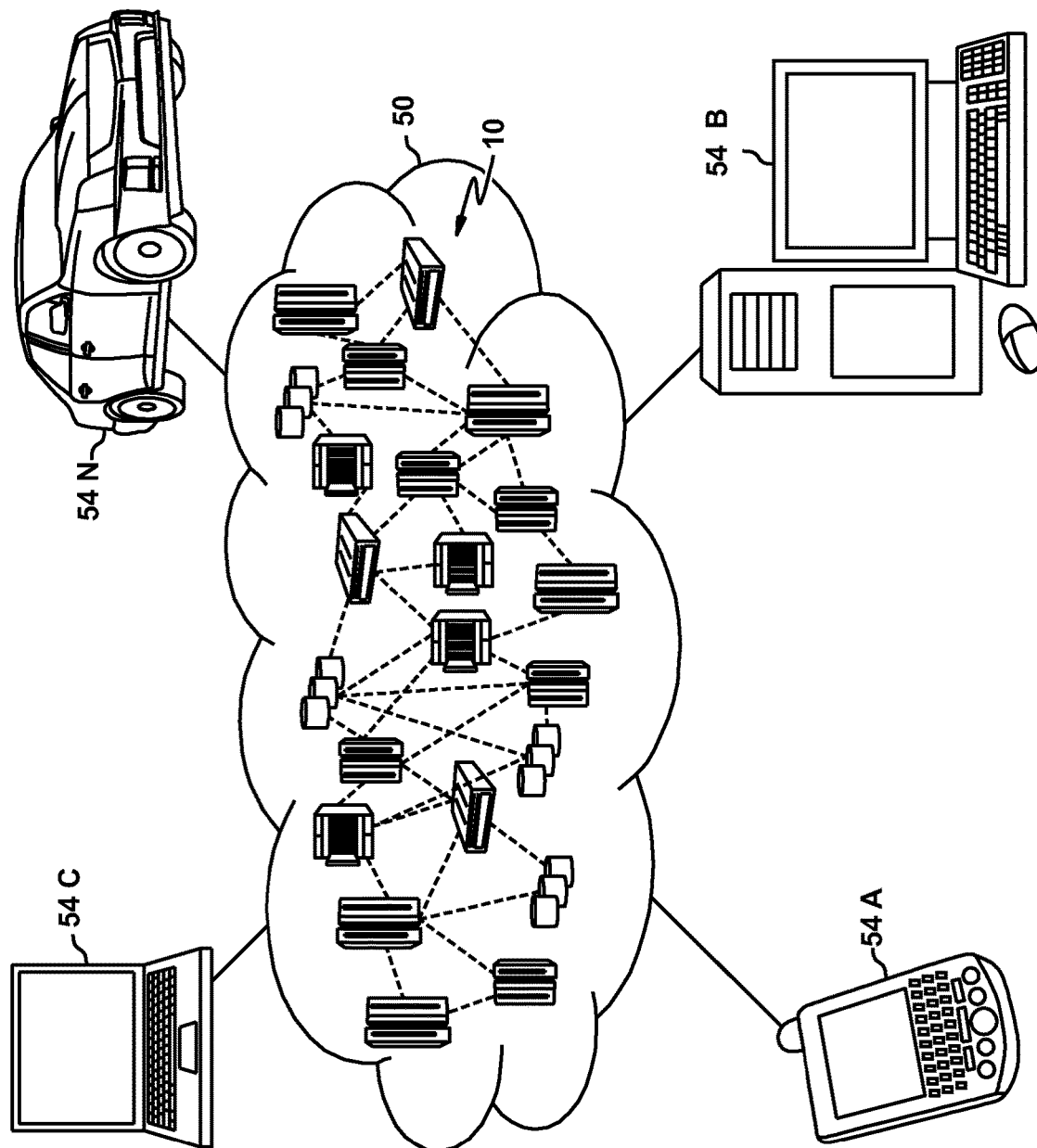
FIG. 7 depicts a cloud computing environment according to an embodiment of the present invention.
Figure 8:
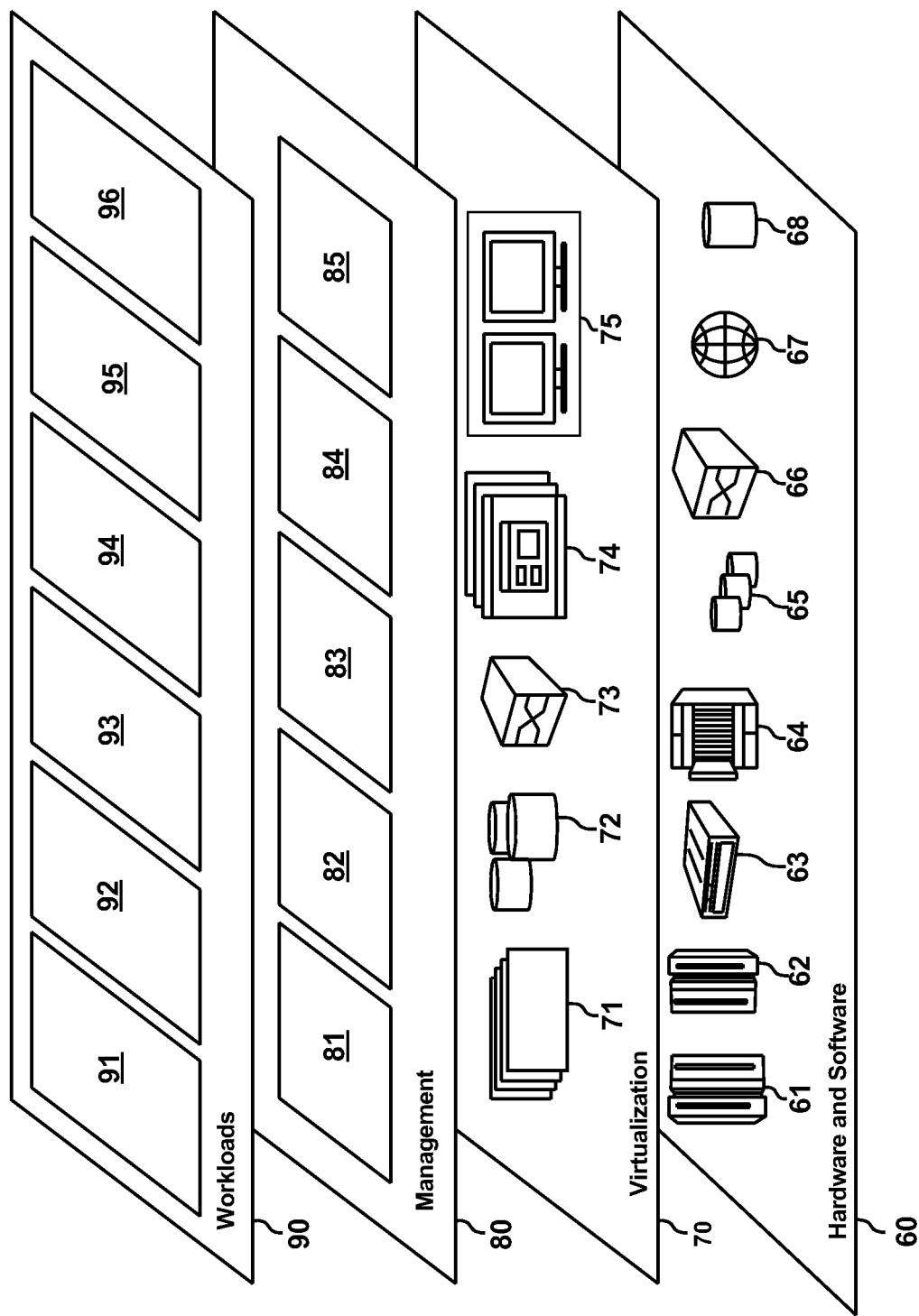
FIG. 8 depicts abstraction model layers according to an embodiment of the present invention.

The network 150 may be substantially similar to, or the same as, network 50 described in FIG. 7 and FIG. 8. In some embodiments, the network 150 can be implemented using any number of any suitable communications media. For example, the network may be a wide area network (WAN), a local area network (LAN), an internet, or an intranet. In certain embodiments, the various systems may be local to each other, and communicate via any appropriate local communication medium. For example, the VR device 102 may communicate with database 114 using a WAN, one or more hardwire connections (e.g., an Ethernet cable) and/or wireless communication networks (e.g., wireless router).

Figure 6:
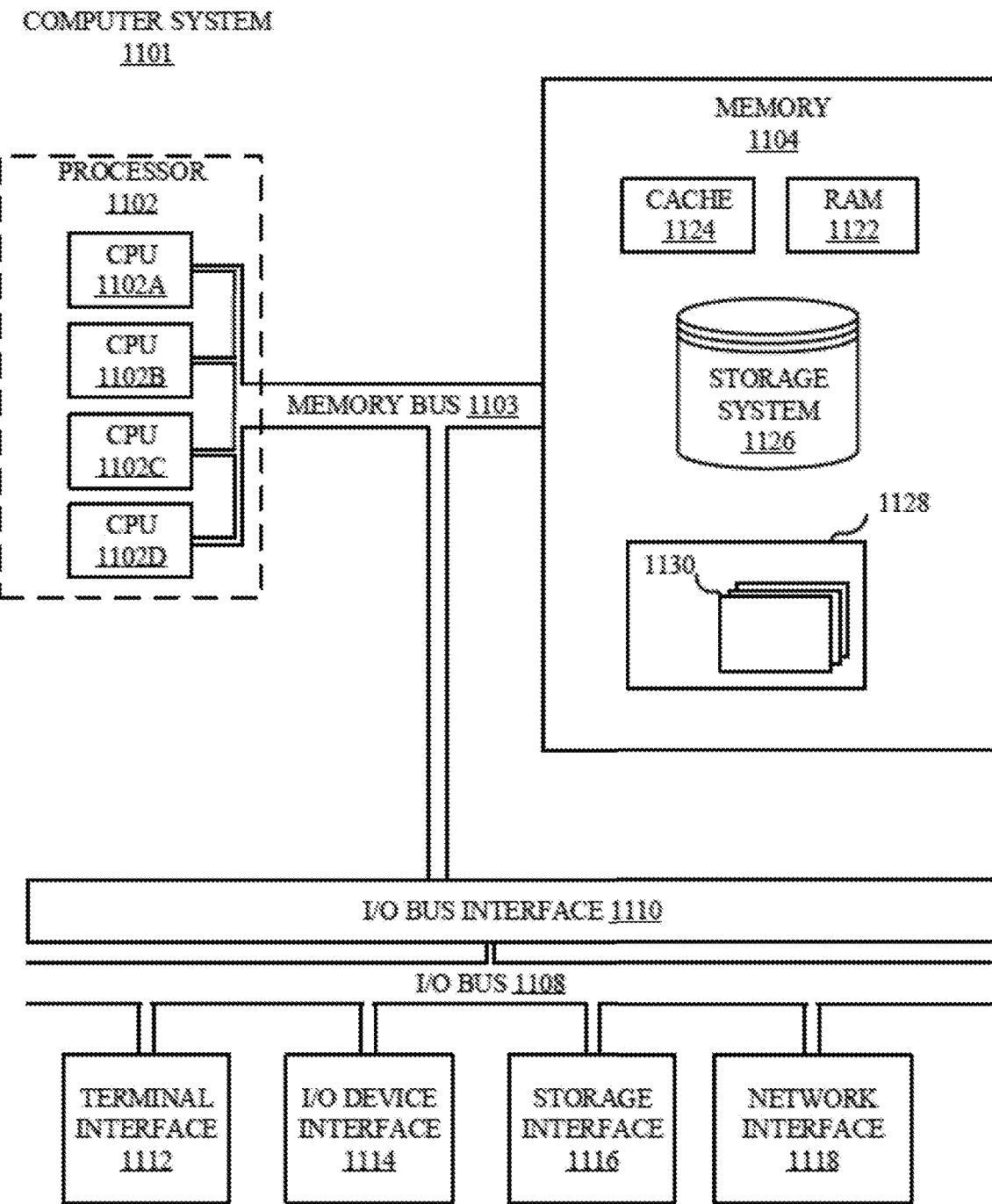
FIG. 6 illustrates a high-level block diagram of an example computer system that may be used in implementing one or more of the methods, tools, and modules, and any related functions, described herein, in accordance with embodiments of the present disclosure.

The VR device 102 may be any type of computer system and may be substantially similar to computer system 1101 of FIG. 6. The VR device 102 may be any type of device configured to output a virtual reality experience to a user. For example, the VR device 102 may comprise a VR headset that displays a virtual environment.

In the illustrated embodiment, the VR device 102 includes a processor 104, a user interface 106, and an audio sensor 108. The user interface 106 allows a user to interact with the VR device 102. The audio sensor 108 is configured to detect audio stimuli 120 or sounds that are external to the in-game environment. For example, the audio sensor 108 may pick up noise generated from a dog barking external to the virtual reality simulation. The audio sensor 108 may be hardwired to the VR device 102 or connected wirelessly through network 150. For example, the audio sensor 108 may be located in another device, such as a smart speaker, that may pick up external sounds and relay the sounds to VR device 102 through network 150. In another embodiment, the audio sensor 108 is physically connected to the VR device 102.

In the illustrated embodiment, the VR device 102 includes an immersion module 110 configured to analyze external audio stimuli 120. For example, the immersion module 110 may be active when the user is interacting with the VR device 102. When external audio stimuli 120 (e.g., phone ringing, door slamming, person talking, etc.) is detected by the audio sensor 108, the immersion module 110 will be triggered to analyze the external audio stimuli 120. The immersion module 110 compares the external stimuli 120 to an audio input list 112A to identify the external audio stimuli 120. Once identified, the external stimuli 120 is mapped to visual stimuli based on in-game environmental factors, and then the visual stimuli are displayed in the in-game environment. In the illustrated embodiment, the immersion module 110 is disposed within the VR device 102 to prevent any latency issues when analyzing external audio stimuli 120. However, in another embodiment, the immersion module may be included in database 114.

In embodiments, audio input list 112A may include a default list of known audio inputs. For example, the list may include various sound profiles for known types of sounds that match detected external sounds. In an embodiment, audio input list 112A may be updated by the database 114 with additional sounds from audio input list 112B. For example, audio input list 112B may include new sounds that have been generated and associated with types of in-game environmental factors using machine learning module 116. In some embodiments, audio input list 112B may be updated with new sounds utilizing a supervised training model.

In embodiments, audio input list 112B on database 114 may be accessed by VR device 102 via network 150. In embodiments, the VR device 102 may send, receive, and/or store data at database 114. For example, mapping data for generating visual stimuli that is mapped to external stimuli may be sent to database 114 for analysis by machine learning module 116.

The database 114 may be any type of computer system and may be substantially similar to computer system 1101 of FIG. 6. In some embodiments, database 114 may be a cloud database. Database 114 may store historical data received from VR device 102 such as, historical data for mapping external stimuli and visual stimuli, data regarding types of identified sounds corresponding to in-game visual stimuli, and in-game immersion experience data (e.g., user reaction to visual stimuli).

In an embodiment, the machine learning module 116 may include one or more artificial neural networks configured to learn from various historical data received from VR device 102. For example, the VR device 102 may use machine learning module 116 to analyze historical data for accuracy of matching sound profiles of external audio stimuli to sound profiles of known sounds within the audio input list. The machine learning module 116 may correlate historical sound recognition data and mapping data to improve displaying visual stimuli that more accurately matches the current in-game VR environment. As more data is learned by the system 100, the weights of the neural network can be adjusted, automatically, by processor 104. Over time, the system 100 can become more accurate in determining what type of visual stimuli to display within an in-game environment for each respective sound.

It is noted that FIG. 1 is intended to depict the representative major components of the virtual reality system 100. In some embodiments, however, individual components may have greater or lesser complexity than as represented in FIG. 1, components other than or in addition to those shown in FIG. 1 may be present, and the number, type, and configuration of such components may vary. Likewise, one or more components shown with the virtual reality system 100 may not be present, and the arrangement of components may vary.

For example, while FIG. 1 illustrates an example virtual reality system 100 having a single VR device 102 and one database 114, suitable network architectures for implementing embodiments of this disclosure may include any number of VR devices and databases. The various models, modules, systems, and components illustrated in FIG. 1 may exist, if at all, across a plurality of VR devices and databases.

Figure 2:
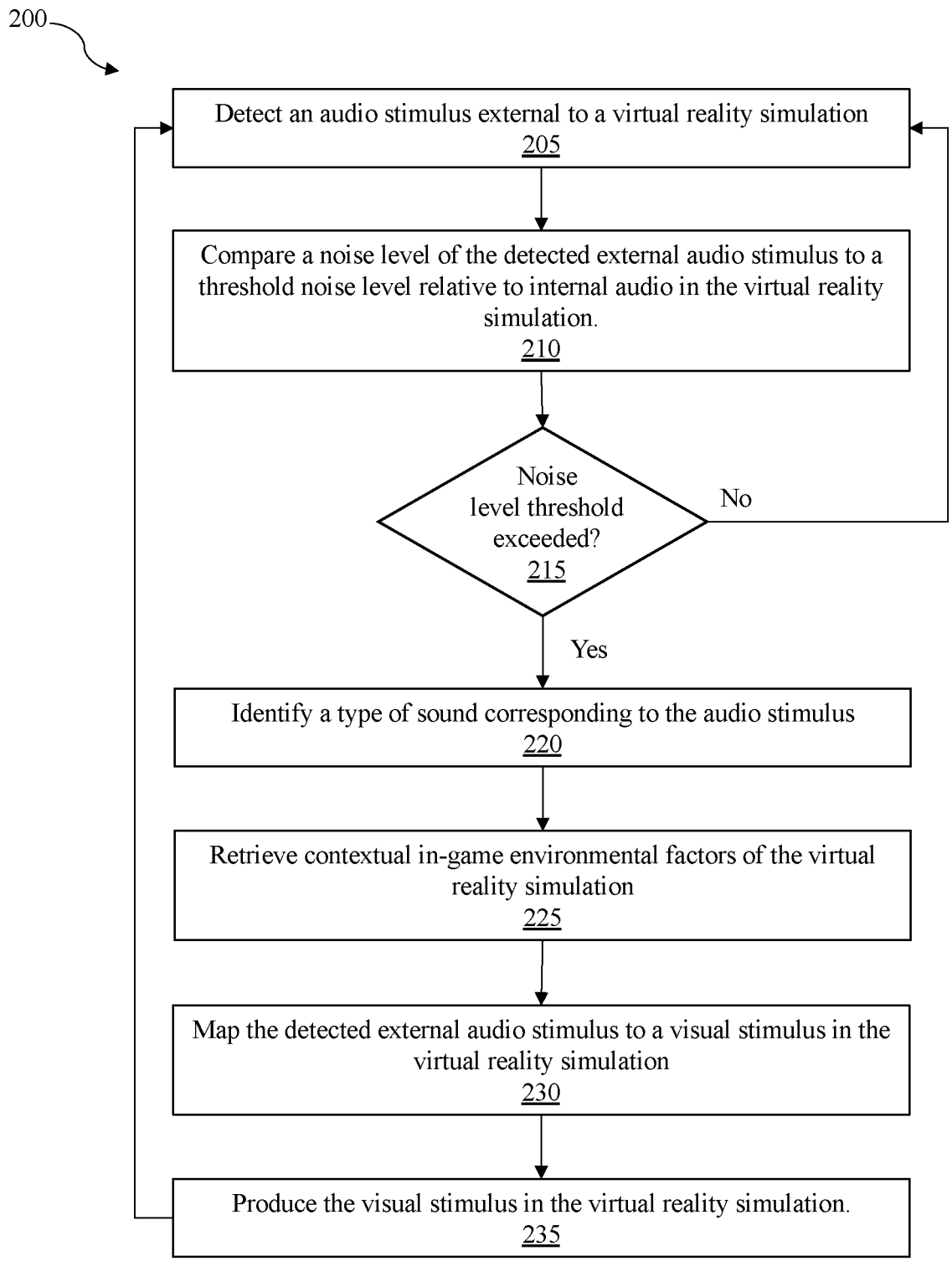
FIG. 2 illustrates a flow diagram of an example process for displaying mapped visual stimuli within a virtual reality simulation, in accordance with embodiments of the present disclosure.

Referring now to FIG. 2, shown is a flow diagram of an example process 200 for displaying mapped visual stimuli within a virtual reality simulation, in accordance with embodiments of the present disclosure. The process 200 may be performed by processing logic that comprises hardware (e.g., circuitry, dedicated logic, programmable logic, microcode, etc.), software (e.g., instructions run on a processor to perform hardware simulation), firmware, or a combination thereof. In some embodiments, the process 200 is a computer-implemented process. The process 200 may be performed by processor 104 exemplified in FIG. 1.

The process 200 begins by detecting an audio stimulus external to a virtual reality simulation. This is illustrated at step 205. In embodiments, the audio stimulus may be detected by the processor by receiving data from audio sensor 108 exemplified in FIG. 1. For example, the audio senor is configured to pick up any external audio stimuli, such as people talking, doors closing, phones ringing, dogs barking, etc. In some embodiments, the detecting of an external audio stimulus may trigger immersion module 110, exemplified in FIG. 1, to become active. In other embodiments, the immersion module 110 may be continuously running as a background application. In embodiments, the virtual reality simulation may be any type of artificial reality simulation and is not meant to be limiting. For example, artificial reality simulation may include both virtual reality simulations and augmented reality simulations.

Once an audio stimulus has been detected, the process 200 continues by comparing the noise level of the audio stimulus to a threshold noise level relative to internal audio in the virtual reality simulation. This is illustrated at step 210. For example, the noise level (e.g., decibel level) of audio produced from a slamming door will be compared to in-game audio levels. For example, within a jungle simulation, the sound of the door slamming will be compared to the decibel level of in-game audio sounds (e.g., animal sounds, babbling river water, wind, swaying tree sounds, etc.) from within the jungle setting. In an embodiment, it is contemplated that the VR device may include noise cancelling headphones. In such an embodiment, the threshold noise level may set at a higher level to compensate for the noise cancelling headphones. For example, a user wearing noise cancelling headphones may not hear medium noise level (e.g., 60 decibels) external sounds over in-game audio sounds, but may hear higher noise level (e.g., 90 decibels) external sounds.

The process 200 continues by determining if a noise level threshold has been exceeded by the noise level of the detected external audio stimulus. This is illustrated at step 215. If the noise level of the external audio does not exceed the noise level threshold, "No" at step 215, then the process 200 continues by detecting other external audio at step 205. For example, if external noise is not loud enough to be heard by the user within the in-game simulation (e.g., detected audio does not meet the threshold), the processor will determine it is not necessary to map the external noise to a visual stimulus and will continue to detect for other external sounds.

If the noise level threshold has been exceeded, "Yes" at step 215, the process 200 continues by identifying a type of sound corresponding to the detected external audio stimulus. This is illustrated at step 220. In embodiments, identifying the audio stimulus may be performed by the immersion module 110 that is local to VR device 102 exemplified in FIG. 1. In some embodiments, the sound recognition analysis may be performed in conjunction with machine learning software (e.g. machine learning module 116 as exemplified in FIG. 1), for example, sound feature extraction and comparison.

In embodiments, a sound profile of the detected external audio stimulus is compared to sound profiles of a plurality of types of known sounds (e.g., audio input list 112A and/or 112B). For example, the detected sound profile of a dog barking may be compared to a list of sound profiles that include various known animal noises. The list may include multiple versions of dog barks, such that the external dog barking sound may be accurately identified. The immersion module 110 may determine a highest percentage match (e.g., comparing pitch, tract, power, etc.) of the sound profile of the detected external audio stimulus to a sound profile of a first type of sound (e.g., a matching dog bark). Once the immersion module 110 determines the closest match for the external audio stimulus, the immersion module 110 will select the first type of sound as the type of sound corresponding to the detected external audio stimulus.

In some embodiments, the immersion module 110 may generate an acoustic fingerprint from the external audio stimulus. The acoustic fingerprint may be in the form of a time-frequency graph (e.g., a spectrogram), or in any form suitable for acoustic analysis. The generated acoustic fingerprint, or portions thereof (e.g., just the peaks in the spectrogram to remove low-level background noise), can then be compared to a set of acoustic fingerprints for known noises (e.g., dogs barking) stored in a database or in the VR device, for example. Based on the comparison, the real-world source of the noise or type of sound can be identified.

Once the external type of sound is identified, the process 200 continues by retrieving in-game environmental factors of the virtual reality simulation. This is illustrated at step 225. In-game environmental factors may be retrieved from analyzing metadata regarding contextual visual objects currently being displayed in the virtual reality simulation. For example, the processor may determine from in-game data that the user is seeing a virtual jungle environment displaying tree branches, various animals, a flowing river, and the like.

Once the in-game environmental factors have been retrieved, the process 200 continues by mapping the detected external audio stimulus to a visual stimulus in the virtual reality simulation based on the identified type of sound and the environmental factors. This is illustrated at step 230. In embodiments, the processor will map the identified external sound to a visual stimulus within the in-game environment by utilizing a mapping table. An example mapping table is exemplified in FIG. 3. The mapping table may include various in-game simulations (e.g., environments) and corresponding visual stimuli that are mapped to the external sound when the sound occurs. For example, the mapping table may include a door slamming as an identified sound and the associated visual stimulus may be a tree branch breaking when in-game environmental factors indicate the user is in a jungle simulation.

Once the detected external audio stimulus is mapped to the visual stimulus, the process 200 continues by producing the visual stimulus in the virtual reality simulation. This is illustrated by step 235. For example, returning to the jungle simulation, using the mapping table the processor will determine that the visual stimulus matching the identified sound of the door slamming will be a tree branch breaking and falling. Once determined, the processor will display a tree branch breaking and falling within the user's line of site within the in-game environment. In this way, the user may associate the door slamming with the sound and visual that a tree branch breaking and falling would make, thus maintaining the user's emersion experience.

Once the visual stimulus is produced to match the external audio, the process 200 may continue to detect other external audio stimuli. This is illustrated by returning to step 205. The processor will continue to detect external sounds until the VR device is deactivated, or, in some embodiments, the user manually selects the immersion module to deactivate. In another embodiment, it is contemplated that rather than mapping the external sound to a visual stimulus, the system may obfuscate the external sound by increasing the volume of one or more in-game sounds until the external sound terminates.

In an embodiment, the system may augment detected external audio stimuli with in-game audio to help maintain immersion. For example, returning to the door slamming scenario, the system may initiate other sounds (e.g., branch snapping sound, leaves rustling sound, etc.) in an attempt to mask the external sound of the slamming door. The augmented audio would be generated at the same time the mapped visual stimuli is produced within the in-game environment.

In an embodiment, the system may compare the sound profile associated with the detected external audio stimulus to a plurality of sound profiles associated with in-game visual stimuli within the virtual reality simulation. The system may determine the closest matching sound profile associated with an in-game visual stimulus and display the visual stimulus. For example, the closest in-game sound profile match of the door slamming may be the sound profile of a tiger roaring within the jungle simulation. The system would then display an in-game virtual tiger to maintain immersion when the door slamming sound is detected in order to mask the sound. In this way, the system may not need to identify the external audio stimuli (e.g., identify the sound as a door slamming), rather the system would only need to match it to an in-game audio profile then display an associated visual stimulus.

Referring now to FIG. 3, shown is shown is an example sound mapping table 300, in accordance with embodiments of the present disclosure. The mapping table 300 exemplified in FIG. 3 is only used as an example and is not meant to be limiting. In other embodiments, the mapping table 300 may include alternative types of sounds, simulations, and the like.

In the illustrated embodiment, the mapping table 300 includes a sound type column 301 that lists types of identified external sounds. For example, the table includes a door slamming, a phone ringing, a person talking, and a dog barking as identified sounds. Each sound in the sound column 301 includes a matching visual stimulus to be mapped to a respective VR environment depending on the current in-game simulation. In the illustrated embodiment, the mapping table 300 includes a jungle simulation 302A, a city simulation 302B, and a snow simulation 302C (collectively referred to as in-game simulation 302). For example, a slamming door may be mapped to a tree branch falling in a jungle simulation 302A, a car accident in a city simulation 302B, or an avalanche in a snow simulation 302C. In this way, the sound heard by a user during the VR simulation may be visually linked to an event. Linking the sound to a visual event reduces the likelihood of interrupting the immersion experience.

In some embodiments, the mapping of the sound type to the in-game simulation 302 may include various subsets depending on determined environmental factors. For example, if a user is in a city simulation 302B where it is raining (e.g., determined by in-game environmental factors), the external door slamming may be mapped to lightning to appear as the sound of thunder, rather than as sound coming from a car accident.

Figure 4:
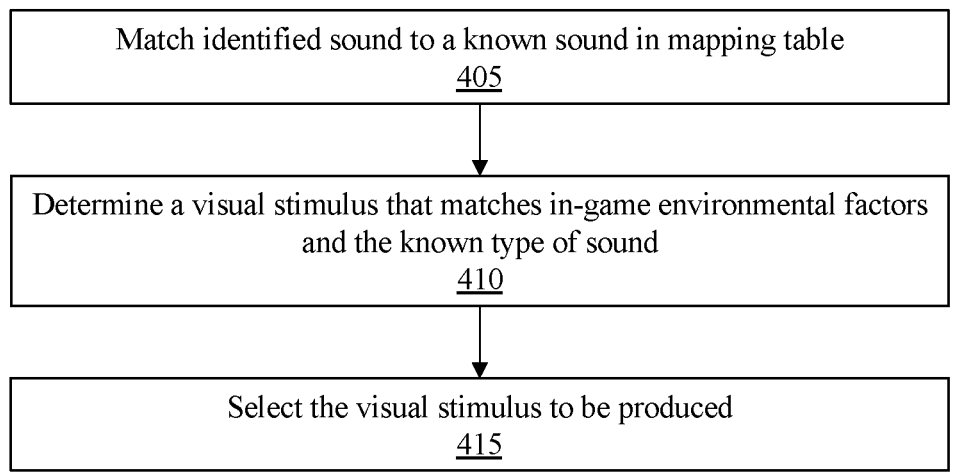
FIG. 4 illustrates a flow diagram of an example process for mapping an external audio stimulus to a visual stimulus within a virtual reality simulation, in accordance with embodiments of the present disclosure.

Referring now to FIG. 4, shown is a flow diagram of an example process 400 for mapping an external audio stimulus to a visual stimulus within a virtual reality simulation, in accordance with embodiments of the present disclosure. Process 400 may be in addition to or a subset of process 200. The process 400 may be performed by processing logic that comprises hardware (e.g., circuitry, dedicated logic, programmable logic, microcode, etc.), software (e.g., instructions run on a processor to perform hardware simulation), firmware, or a combination thereof. In some embodiments, the process 400 is a computer-implemented process. The process 400 may be performed by processor 104 exemplified in FIG. 1.

The process 400 begins by matching the identified type of sound corresponding to the detected external audio stimulus to a known type of sound from a plurality of sounds in a mapping table. This is illustrated at step 405. It is assumed that step 405 occurs after the external sound has be previously identified. For example, the external sound may be identified as a dog barking at step 220 of process 200. Once identified, the detected audio stimulus may be matched to known sounds within the mapping table. For example, the identified sound of a dog barking will be compared to a list of known types of sounds within a mapping table and matched with an equivalent sound. An example of a mapping table 300 is exemplified in FIG. 3.

Once the identified sound is matched to a known type of sound from the mapping table, the process 400 continues by determining environment factors that match in-game environmental factors of the virtual reality simulation. This is illustrated at step 410. The processor may utilize metadata output from the user's in-game location to determine in-game environmental factors. For example, metadata may indicate the user is walking through a city simulation during a rainstorm.

Once in-game environmental factors are recognized by the system, the process 400 continues by selecting a visual stimulus from the mapping table that corresponds to the identified type of sound and in-game environmental factors. This is illustrated at step 415. For example, if the identified sound is a door slamming and the in-game environmental factors indicate a snow simulation, the processor would determine that the visual stimulus to display is an avalanche. In another example, the processor may determine that an external dog barking sound for a city simulation will be best represented by displaying a virtual dog barking. Once selected, the processor may produce the virtual dog barking within the simulation (e.g., as shown at step 235 in FIG. 2).

In this way, the user will assume the external noise heard is coming from the virtually displayed dog and not from the external environment. Displaying a visual stimulus that matches or closely matches the external sound allows the user to maintain immersion in the VR experience.

Figure 5:
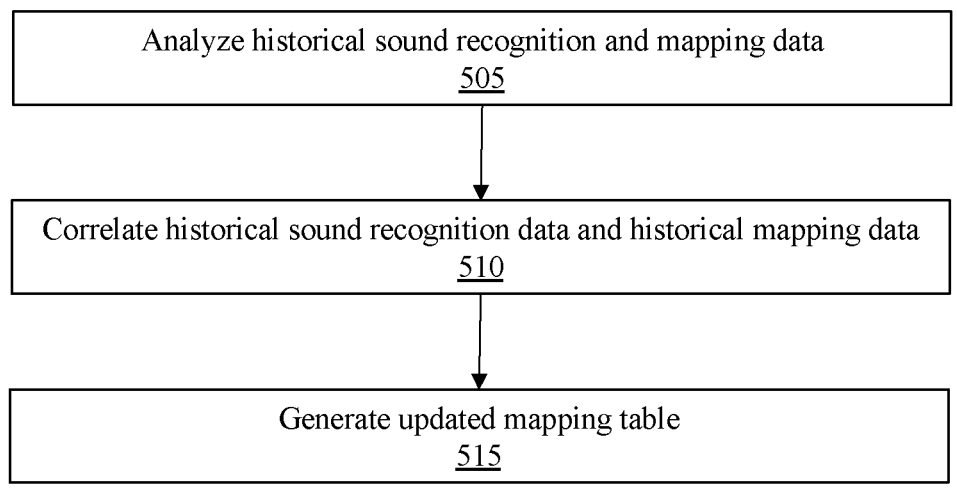
FIG. 5 illustrates a flow diagram of an example process for analyzing historical sound recognition and mapping data utilizing machine learning, in accordance with embodiments of the present disclosure.

Referring now to FIG. 5, shown is a flow diagram of an example process 500 for analyzing historical sound recognition and mapping data utilizing machine learning, in accordance with embodiments of the present disclosure. Process 500 may be in addition to or a subset of process 200. The process 500 may be performed by processing logic that comprises hardware (e.g., circuitry, dedicated logic, programmable logic, microcode, etc.), software (e.g., instructions run on a processor to perform hardware simulation), firmware, or a combination thereof. In some embodiments, the process 500 is a computer-implemented process. The process 500 may be performed by processor 104 exemplified in FIG. 1.

Process 500 begins by analyzing historical sound recognition data and mapping data of detected external audio stimuli to visual stimuli. This is illustrated at step 505. The analyzing may be performed using machine learning module 116 exemplified in FIG. 1. The machine learning module 116 may comprise various machine learning engines (artificial neural network, correlation engines, natural language processing engine, reinforcement feedback learning model, etc.) to analyze data generated from the historical sound recognition and sound mapping data. For example, the machine learning module may analyze patterns and accuracy in matching sound profiles of external audio to known sound profiles within the audio inputs list. In some embodiments, the machine learning module may utilize machine learning to analyze the noise level threshold to determine if settings are set too high or low depending on user reaction data. For example, user reaction data may indicate that the user paused the VR device when an external sound was heard (e.g., an external voice calling the user's name) indicating the immersion experience was broken. This may have occurred because the noise threshold was set too high, such that the external sound was not mapped to a visual stimulus to aid in preventing breaking the immersion experience.

The process 500 continues by correlating the historical sound recognition data with the historical sound mapping data. This is illustrated at step 510. For example, the machine learning module may correlate historical sound recognition data and mapping data to improve displaying visual stimuli that more accurately matches the current in-game VR environment. Various historical data sets may be correlated to determine dependencies based on different variables when identifying sounds and mapping the sounds to various environments.

The process 500 continues by generating an updated mapping table based on the correlating. This is illustrated at step 515. The sound mapping table may be updated with new visual stimuli that correlate with identified sounds to better coincide with in-game environmental factors. Improved accuracy in sound identification may further improve visual stimuli matching within the in-game environment. For example, using historical metadata determined from in-game environmental mapping, the system may improve recognition of in-game location of the user in order to more accurately produce visual stimuli matching the in-game location.

Referring now to FIG. 6, shown is a high-level block diagram of an example computer system 1101 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 1101 may comprise one or more CPUs 1102, a memory subsystem 1104, a terminal interface 1112, a storage interface 1116, an I/O (Input/Output) device interface 1114, and a network interface 1118, all of which may be communicatively coupled, directly or indirectly, for inter-component communication via a memory bus 1103, an I/O bus 1108, and an I/O bus interface unit 1110.

The computer system 1101 may contain one or more general-purpose programmable central processing units (CPUs) 1102A, 1102B, 1102C, and 1102D, herein generically referred to as the CPU 1102. In some embodiments, the computer system 1101 may contain multiple processors typical of a relatively large system; however, in other embodiments the computer system 1101 may alternatively be a single CPU system. Each CPU 1102 may execute instructions stored in the memory subsystem 1104 and may include one or more levels of on-board cache. In some embodiments, a processor can include at least one or more of, a memory controller, and/or storage controller. In some embodiments, the CPU can execute the processes included herein (e.g., process 200, 400, and 500).

System memory 1104 may include computer system readable media in the form of volatile memory, such as random access memory (RAM) 1122 or cache memory 1124. Computer system 1101 may further include other removable/non-removable, volatile/non-volatile computer system data storage media. By way of example only, storage system 1126 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 1104 can include flash memory, e.g., a flash memory stick drive or a flash drive. Memory devices can be connected to memory bus 1103 by one or more data media interfaces. The memory 1104 may include at least one program product having a set (e.g., at least one) of program modules that are configured to carry out the functions of various embodiments.

Although the memory bus 1103 is shown in FIG. 6 as a single bus structure providing a direct communication path among the CPUs 1102, the memory subsystem 1104, and the I/O bus interface 1110, the memory bus 1103 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1110 and the I/O bus 1108 are shown as single units, the computer system 1101 may, in some embodiments, contain multiple I/O bus interface units 1110, multiple I/O buses 1108, or both. Further, while multiple I/O interface units are shown, which separate the I/O bus 1108 from various communications paths running to the various I/O devices, in other embodiments some or all of the I/O devices may be connected directly to one or more system I/O buses.

In some embodiments, the computer system 1101 may be a multi-user mainframe computer system, a single-user system, or a server computer or similar device that has little or no direct user interface, but receives requests from other computer systems (clients). Further, in some embodiments, the computer system 1101 may be implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary computer system 1101. In some embodiments, however, individual components may have greater or lesser complexity than as represented in FIG. 6, components other than or in addition to those shown in FIG. 6 may be present, and the number, type, and configuration of such components may vary.

One or more programs/utilities 1128, each having at least one set of program modules 1130 may be stored in memory 1104. The programs/utilities 1128 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 1128 and/or program modules 1130 generally perform the functions or methodologies of various embodiments.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics Are As Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktops 96.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   detecting, by a processor, an audio stimulus external to a virtual reality simulation;
   comparing, by the processor, a noise level of the audio stimulus to a threshold noise level relative to internal audio in the virtual reality simulation, wherein comparing the noise level of the audio stimulus to the threshold noise level relative to internal audio in the virtual reality simulation comprises:
      comparing, by the processor, a decibel level of the audio stimulus to a decibel level of a first sound in the virtual reality simulation; and
      determining, by the processor, whether a difference between the decibel level of the audio stimulus and the decibel level of the first sound exceeds the threshold noise level;
   identifying, by the processor and in response to determining that the noise level of the audio stimulus exceeds the threshold noise level, a type of sound corresponding to the audio stimulus;
   retrieving, by the processor, in-game environmental factors of the virtual reality simulation;
   mapping, by the processor, the audio stimulus to a visual stimulus for obscuring the audio stimulus in the virtual reality simulation based on the type of sound and the in-game environmental factors using a mapping table, wherein the mapping table associates types of sounds and in-game environmental factors to visual stimuli that obscure the audio stimulus and maintain user immersion for the in-game environment; and
   obscuring, by the processor, user recognition of the audio stimulus by inserting the visual stimulus in the virtual reality simulation to maintain user immersion in the virtual reality simulation.

2. The method of claim 1, wherein identifying the type of sound corresponding to the audio stimulus comprises:
   comparing, by the processor, a sound profile of the audio stimulus to sound profiles of a plurality of types of sounds;
   determining, by the processor, a highest percentage match of the sound profile of the audio stimulus to a sound profile of a first type of sound; and
   selecting, by the processor, the first type of sound as the type of sound corresponding to the audio stimulus.

3. The method of claim 2, further comprising:
   updating, by the processor, the plurality of types of sounds with one or more new sound profiles received from a database.

4. The method of claim 1, further comprising:
   updating, by the processor, the mapping table with one or more new known sounds, wherein each of the one or more new known sounds includes mapped visual stimuli for a respective in-game environment.

5. The method of claim 1, further comprising:
   analyzing, by the processor and utilizing machine learning, historical sound recognition data for identifying types of sounds and historical sound mapping data of audio stimuli to visual stimuli;
   correlating, by the processor and utilizing machine learning, the historical sound recognition data with the historical sound mapping data; and
   updating, by the processor and based on the correlating, the mapping table.

6. The method of claim 1, wherein retrieving in-game environmental factors of the virtual reality simulation comprises:
   analyzing, by the processor, metadata associated with a plurality of visual stimuli displayed within the virtual simulation.

7. The method of claim 1, wherein the audio stimulus is received from one or more communicatively coupled sound sensors.

8. The method of claim 1, wherein the visual stimulus represents a naturally occurring element within the virtual reality simulation.

9. The method of claim 1, wherein the threshold noise level is set at a higher threshold level to accommodate a noise canceling device.

10. A virtual reality system comprising:
a processor; and
a computer-readable storage medium communicatively coupled to the processor and storing program instructions which, when executed by the processor, cause the processor to perform a method comprising:
detecting an audio stimulus external to a virtual reality simulation;
comparing a noise level of the audio stimulus to a threshold noise level relative to internal audio in the virtual reality simulation, wherein comparing the noise level of the audio stimulus to the threshold noise level relative to internal audio in the virtual reality simulation comprises:
comparing a decibel level of the audio stimulus to a decibel level of a first sound in the virtual reality simulation; and
determining whether a difference between the decibel level of the audio stimulus and the decibel level of the first sound exceeds the threshold noise level;
identifying, in response to determining that the noise level of the audio stimulus exceeds the threshold noise level, a type of sound corresponding to the audio stimulus;
retrieving in-game environmental factors of the virtual reality simulation;
mapping the audio stimulus to a visual stimulus for obscuring the audio stimulus in the virtual reality simulation based on the type of sound and the in-game environmental factors using a mapping table, wherein the mapping table associates types of sounds and in-game environmental factors to visual stimuli that obscure the audio stimulus; and
obscuring user recognition of the audio stimulus by inserting the visual stimulus in the virtual reality simulation to maintain user immersion in the virtual reality simulation.

11. The virtual reality system of claim 10, wherein identifying the type of sound corresponding to the audio stimulus comprises:
comparing a sound profile of the audio stimulus to sound profiles of a plurality of types of sounds;
determining a highest percentage match of the sound profile of the audio stimulus to a sound profile of a first type of sound; and
selecting the first type of sound as the type of sound corresponding to the audio stimulus.

12. The virtual reality system of claim 11, wherein the method performed by the processor further comprises:
updating the plurality of types of sounds with one or more new sound profiles received from a database.

13. The virtual reality system of claim 10, wherein the method performed by the processor further comprises:
updating the mapping table with one or more new known sounds, wherein each of the one or more new known sounds includes mapped visual stimuli for a respective in-game environment.

14. The virtual reality system of claim 10, wherein the method performed by the processor further comprises:
analyzing, utilizing machine learning, historical sound recognition data for identifying types of sounds and historical sound mapping data of audio stimuli to visual stimuli;
correlating, utilizing machine learning, the historical sound recognition data with the historical sound mapping data; and
updating, based on the correlating, the mapping table.

15. The virtual reality system of claim 10, wherein retrieving in-game environmental factors of the virtual reality simulation comprises:
analyzing metadata associated with a plurality of visual stimuli displayed within the virtual simulation.

16. A computer program product comprising a computer-readable storage medium having program instructions embodied therewith, wherein the computer-readable storage medium is not a transitory signal per se, the program instructions executable by a processor to cause the processor to perform a method comprising:
detecting an audio stimulus external to a virtual reality simulation;
comparing a noise level of the audio stimulus to a threshold noise level relative to internal audio in the virtual reality simulation;
identifying, in response to determining that the noise level of the audio stimulus exceeds the threshold noise level, a type of sound corresponding to the audio stimulus;
retrieving in-game environmental factors of the virtual reality simulation;
mapping the audio stimulus to a visual stimulus for obscuring the audio stimulus in the virtual reality simulation based on the type of sound and the in-game environmental factors using a mapping table, wherein the mapping table associates types of sounds and in-game environmental factors to visual stimuli that obscure the audio stimulus and maintain user immersion in the virtual reality simulation;
obscuring user recognition of the audio stimulus by inserting the visual stimulus in the virtual reality simulation to maintain user immersion in the virtual reality simulation;
analyzing, utilizing machine learning, historical sound recognition data for identifying types of sounds and historical sound mapping data of audio stimuli to visual stimuli;
correlating, utilizing machine learning, the historical sound recognition data with the historical sound mapping data; and
updating, based on the correlating, the mapping table.

17. The computer program product of claim 16, wherein identifying the type of sound corresponding to the audio stimulus comprises:
comparing a sound profile of the audio stimulus to sound profiles of a plurality of types of sounds;
determining a highest percentage match of the sound profile of the audio stimulus to a sound profile of a first type of sound; and
selecting the first type of sound as the type of sound corresponding to the audio stimulus.

18. The computer program product of claim 16, wherein the method performed by the processor further comprises:
updating the mapping table with one or more new known sounds, wherein each of the one or more new known sounds includes mapped visual stimuli for a respective in-game environment.

* * * * *